United States Patent
Bielefeld et al.

(10) Patent No.: US 11,203,401 B1
(45) Date of Patent: *Dec. 21, 2021

(54) MULTI-SPEED TRANSMISSIONS FOR MARINE PROPULSION DEVICES

(71) Applicant: Brunswick Corporation, Mettawa, IL (US)

(72) Inventors: Brett Bielefeld, Fond du Lac, WI (US); Jeremy L. Alby, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 371 days.

This patent is subject to a terminal disclaimer.

(21) Appl. No.: 16/509,139

(22) Filed: Jul. 11, 2019

(51) Int. Cl.
*B63H 20/20* (2006.01)
*B63H 23/30* (2006.01)
*B63H 23/08* (2006.01)
*B63H 23/02* (2006.01)

(52) U.S. Cl.
CPC ............ *B63H 20/20* (2013.01); *B63H 23/08* (2013.01); *B63H 23/30* (2013.01); *B63H 2023/0283* (2013.01)

(58) Field of Classification Search
CPC ........ B63H 20/20; B63H 23/08; B63H 23/30; B63H 2023/0283
See application file for complete search history.

(56) References Cited

U.S. PATENT DOCUMENTS

| | | | | |
|---|---|---|---|---|
| 2,259,732 A | * | 10/1941 | Burtnett | B60W 10/10 477/94 |
| 4,375,171 A | * | 3/1983 | Morscheck | F16H 3/097 74/331 |
| 6,544,083 B1 | * | 4/2003 | Sawyer | B63H 23/08 192/21 |
| 8,157,694 B2 | * | 4/2012 | Nakamura | B63H 5/10 475/269 |
| 8,246,402 B2 | * | 8/2012 | Okabe | B63H 23/30 440/75 |
| 8,425,373 B2 | | 4/2013 | Okabe et al. | |
| 9,133,910 B1 | * | 9/2015 | VanSelous | B63H 23/04 |

(Continued)

OTHER PUBLICATIONS

Unpublished U.S. Appl. No. 16/171,490 to Jeremy Alby et al., filed Oct. 26, 2018.

*Primary Examiner* — S. Joseph Morano
*Assistant Examiner* — Jovon E Hayes
(74) *Attorney, Agent, or Firm* — Andrus Intellectual Property Law, LLP

(57) ABSTRACT

A transmission for an outboard motor, the transmission having an input shaft with an input gear non-rotatably fixed thereto and rotatable by an engine. A countershaft has a countershaft driven gear and a reverse driving gear non-rotatably fixed thereto, where the countershaft driven gear meshes with the input gear. An output shaft has first and second driven gears non-rotatably fixed thereto. First and second driving gears mesh with the first and second driven gears, a reverse idler gear meshes with the reverse driving gear, and a reverse driven gear meshes with the reverse idler gear. First and second clutches selectively rotate the first and second driving gears with the countershaft in first and second modes at first and second speeds in forward rotation, respectively, and a reverse clutch selectively rotates the output shaft with the reverse driven gear in a reverse mode with reverse rotation.

20 Claims, 6 Drawing Sheets

(56) References Cited

U.S. PATENT DOCUMENTS

| | | | |
|---|---|---|---|
| 9,446,829 B1* | 9/2016 | Williams | F16H 3/04 |
| 9,676,463 B1* | 6/2017 | Fortl | F16H 3/44 |
| 9,718,529 B2* | 8/2017 | Williams | B63H 23/30 |
| 10,144,495 B2* | 12/2018 | Ebihara | B63H 23/30 |
| 10,995,824 B1* | 5/2021 | Bielefeld | F16H 3/10 |
| 2011/0146445 A1* | 6/2011 | Silva | F16H 3/006 |
| | | | 74/665 K |
| 2013/0112041 A1* | 5/2013 | Tamai | B60K 6/547 |
| | | | 74/665 F |
| 2014/0109704 A1* | 4/2014 | Machida | F16D 21/06 |
| | | | 74/330 |
| 2015/0192193 A1* | 7/2015 | Ichikawa | F16H 3/52 |
| | | | 475/199 |

* cited by examiner

MULTI-SPEED TRANSMISSIONS FOR MARINE PROPULSION DEVICES

FIELD

The present disclosure generally relates to systems and methods for configuring multi-speed transmissions for marine propulsion devices.

BACKGROUND

The following U.S. Patents and Patent Application provide background information and are incorporated by reference in entirety.

U.S. Pat. No. 6,544,083 discloses a gear shift mechanism in which a cam structure comprises a protrusion that is shaped to extend into a channel formed in a cam follower structure. The cam follower structure can be provided with first and second channels that allow the protrusion of the cam to be extended into either which accommodates both port and starboard shifting mechanisms. The cam surface formed on the protrusion of the cam moves in contact with a selected cam follower surface formed in the selected one of two alternative channels to cause the cam follower to move axially and to cause a clutch member to engage with either a first or second drive gear.

U.S. Pat. No. 9,133,910 discloses a marine transmission that includes a synchronizer on a counter rotating shaft to shift into a high speed gear. The synchronizer includes friction surfaces on both sides of the gear body for the high speed gear. The high speed gear mesh is helical and generates axial force that enhances the torque carrying capacity of synchronizing friction surfaces, thereby enabling the shifting into the high speed gear without torque interrupt.

U.S. Pat. No. 9,446,829 discloses a transmission for an outboard marine engine. The transmission comprises a rotatable input shaft that is rotated by an internal combustion engine, a rotatable output shaft that powers a propulsor, a forward gear that causes forward rotation of the output shaft and propulsor, a reverse gear that causes reverse rotation of the output shaft and propulsor, a clutch that is movable between a forward clutch position wherein the forward gear causes the forward rotation of the output shaft and propulsor and a reverse clutch position wherein the reverse gear causes the reverse rotation of the output shaft and propulsor, and an internal ring gear that couples the output shaft to one of the forward gear and the reverse gear.

U.S. Pat. No. 9,676,463 discloses a transmission for a marine propulsion device having an internal combustion engine that drives a propulsor for propelling a marine vessel in water. An input shaft is driven into rotation by the engine. An output shaft drives the propulsor into rotation. A forward planetary gearset that connects the input shaft to the output shaft so as to drive the output shaft into forward rotation. A reverse planetary gearset that connects the input shaft to the output shaft so as to drive the output shaft into reverse rotation. A forward brake engages the forward planetary gearset in a forward gear wherein the forward planetary gearset drives the output shaft into the forward rotation. A reverse brake engages the reverse planetary gearset in a reverse gear wherein the reverse planetary gearset drives the output shaft into the reverse rotation.

U.S. Pat. No. 9,718,529 discloses a marine transmission located within drive housing that includes a torque transmitting gear set and a clutch mechanism. The torque transmitting gear set includes top and bottom bevel gears and opposing side idler bevel gears mounted to a pinion shaft. The pinion shaft is mounted on a carrier and the clutch mechanism engages the carrier to rotate with the input shaft to drive the output shaft in the forward direction and engages the carrier to a reaction plate fixed to the drive housing to drive the output shaft in the reverse direction.

U.S. patent application Ser. No. 16/171,490 discloses an outboard motor having a powerhead that causes rotation of a driveshaft, a steering housing located below the powerhead, wherein the driveshaft extends from the powerhead into the steering housing; and a lower gearcase located below the steering housing and supporting a propeller shaft that is coupled to the driveshaft so that rotation of the driveshaft causes rotation of the propeller shaft. The lower gearcase is steerable about a steering axis with respect to the steering housing and powerhead.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of the present disclosure generally relates a transmission for an outboard motor having an engine. The transmission includes an input shaft having an input gear non-rotatably fixed thereto, the input shaft being rotatable by the engine. The transmission includes a countershaft with a countershaft driven gear and a reverse driving gear each non-rotatably fixed thereto, where the countershaft driven gear meshes with the input gear such that forward rotation of the input shaft causes reverse rotation of the countershaft. The transmission includes an output shaft with a first driven gear and a second driven gear each non-rotatably fixed thereto. A first driving gear meshes with the first driven gear, a second driving gear meshes with the second driven gear, a reverse idler gear meshes with the reverse driving gear, and a reverse driven gear meshes with the reverse idler gear. The transmission has a plurality of clutches including a first clutch, a second clutch, and a reverse clutch, where the first clutch selectively rotates the first driving gear with the countershaft, the second clutch selectively rotates the second driving gear with the countershaft, and the reverse clutch selectively rotates the output shaft with the reverse driven gear. Selectively engaging the plurality of clutches selects between rotation of the output shaft in a first mode with forward rotation at a first speed, a second mode with forward rotation at a second speed that is different than the first speed, and a reverse mode with reverse rotation.

Another embodiment generally relates to a transmission for an outboard motor having an engine. The transmission includes an input shaft having an input gear non-rotatably fixed thereto, the input shaft being rotatable by the engine. The transmission includes a countershaft with a countershaft driven gear and a reverse driving gear each non-rotatably fixed thereto. The countershaft driven gear meshes with the input gear such that forward rotation of the input shaft causes reverse rotation of the countershaft. The transmission includes an output shaft with a first driven gear non-rotatably fixed thereto. A first driving gear meshes with the first driven gear, a reverse idler gear meshes with the reverse driving gear, and a reverse driven gear meshes with the reverse idler gear. The transmission has a plurality of clutches including a first clutch, a second clutch, and a reverse clutch. The first clutch selectively rotates the first driving gear with the countershaft, the second clutch selectively rotates the first driving gear with the input shaft, and the reverse clutch selectively rotates the output shaft with the reverse driven gear. Selectively engaging the plurality of clutches selects between rotation of the output shaft in a first mode with forward rotation at a first speed, a second mode with forward rotation at a second speed that is different than the first speed, and a reverse mode with reverse rotation.

Various other features, objects and advantages of the disclosure will be made apparent from the following description taken together with the drawings.

BRIEF DESCRIPTION OF THE DRAWINGS

The present disclosure is described with reference to the following Figures.

DETAILED DISCLOSURE

It is generally desired within the field of marine propulsion devices to provide a multi-speed transmission, particularly for high horsepower performance. The present inventors have identified that multi-speed transmissions improve acceleration on performance tests and simulations, and may be particularly effective when used with engines having a lesser torque quality along the lower end of the performance curve. However, the present inventors have further identified that packaging a multi-speed transmission including multiple forward speeds, as well as neutral and reverse modes, presents many challenges.

These challenges are exacerbated within the field of outboard motors specifically, and further problematic within the context of an outboard motor having a steerable gearcase. In particular, physical space and weight are at a premium within these outboard motors. In addition to this need for a power-dense architecture, the present inventors have further identified that it is nonetheless desirable that the architecture also provides a power takeoff (PTO) for a water pump and power steering pump, wet clutches for soft shifting, and controlled clutch slipping for trolling and docking capabilities. The present inventors have also identified that it is advantageous to include overrunning, one-way clutches for shifting between gears such that the transmission does not pass through neutral when shifting between different forward speeds.

In certain configurations, particularly within the space of outboard motors and also those having steerable gearcases, is further advantageous for the input and output of the transmission to be coaxial, further lending itself to reduced space and a denser general architecture. Additionally, the present inventors have identified that it would further be beneficial to have an architecture providing easy access to change the overall reduction of the drive system for various vessels and/or engine combinations, as well as speed ranges (for example racing versus standard production, single propeller versus dual propeller, fast boats versus slow boats, and/or the like).

Through research and experimentation, the present inventors have recognized that part of a solution for these needs arises from the realization that not all of the speed reduction must be incorporated within the transmission itself. By configuring the transmission 10 to not incorporate the full amount of speed reduction from the engine 2, the transmission gears and clutches (both discussed in further detail below) may carry less torque, allowing them to be made smaller while also improving component durability. This in turn translates to providing additional packaging flexibility. These may include layshaft of epicyclic (planetary) type architectures, for example, as discussed further below and shown in FIG. 5.

Figure 1:
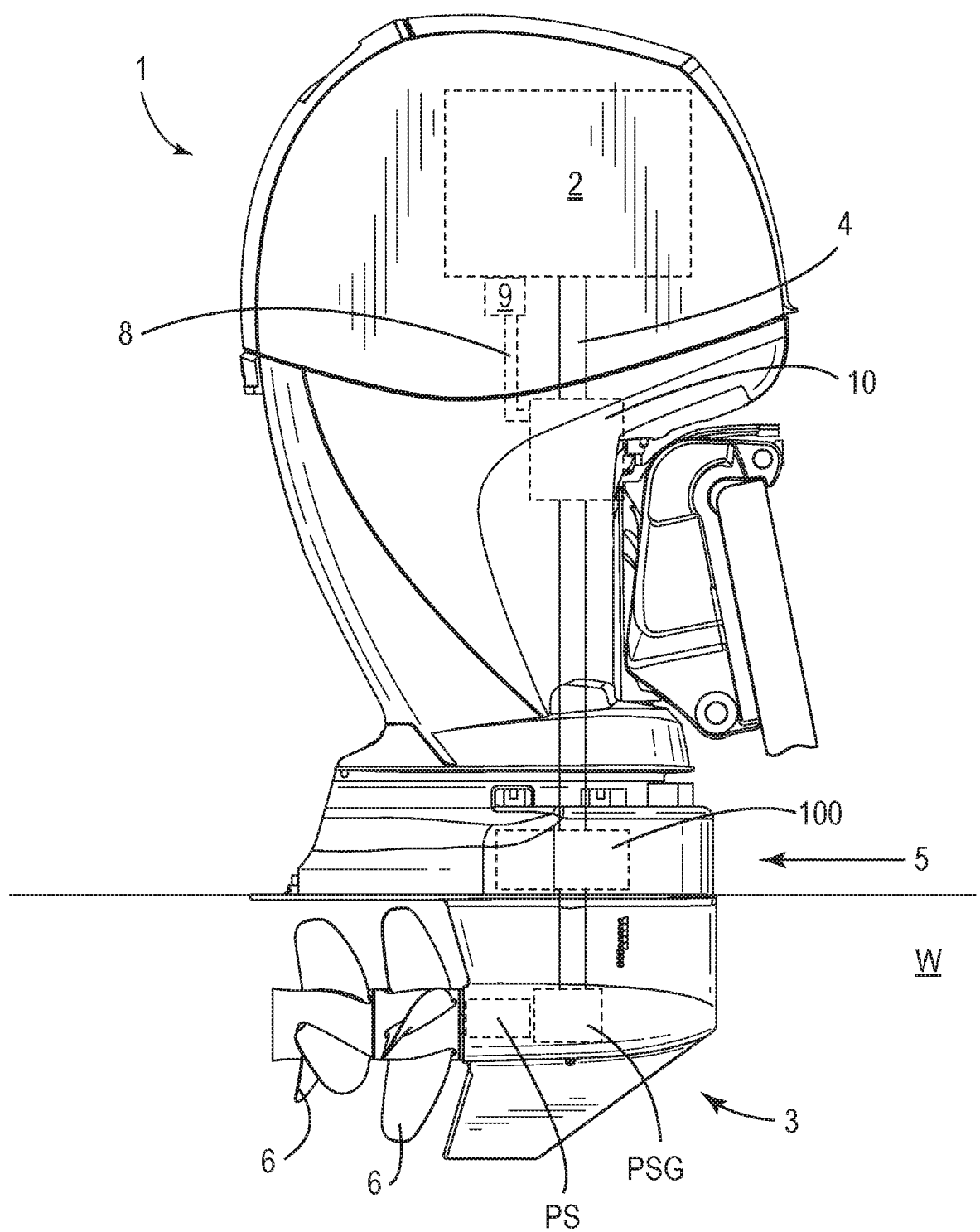
FIG. 1 is a side view of an exemplary marine propulsion device according to the present disclosure.

FIG. 1 shows an exemplary propulsion device 1 according to the present disclosure. The propulsion device 1 includes an engine 2 configured to rotate a driveshaft 4, which through a transmission 10 (discussed below), as well as propeller shaft gearsets PSG and propeller shafts PS contained within gearcase 3 are operational to rotate one or more propellers 6 to propel a vessel through the water W. The transmission 10 and speed reduction device 100, which are each discussed further below, are housed within a gearcase 3 and/or housing 5. As will be discussed further below, the transmission 10 may be operable by a clutch actuator 8, which in certain embodiments is operated through a controller 9 such that the user may effectuate shifting within the transmission 10, or shifting may be controlled automatically or partially automatically through the controller 9. The following are examples of components that may be used in present or altered form for the presently disclosed systems and methods: Mopar 52108342AB for a one-way clutch; Multidisc clutch packs presently used in outboard engines, such as in Mercury Marine's Zeus 3000 transmission, part number 879148T69 or Mercury's ZF transmission, part number ZF 105 S; a controller such as Mercury TVM part number 8M0079409 (also used with the Zeus 3000 transmission), and solenoid valves such as Bosch DRE05SK. Other examples are may also be taken from existing Mercury or other outboard motors, and/or are also be known in the art.

Figure 2:
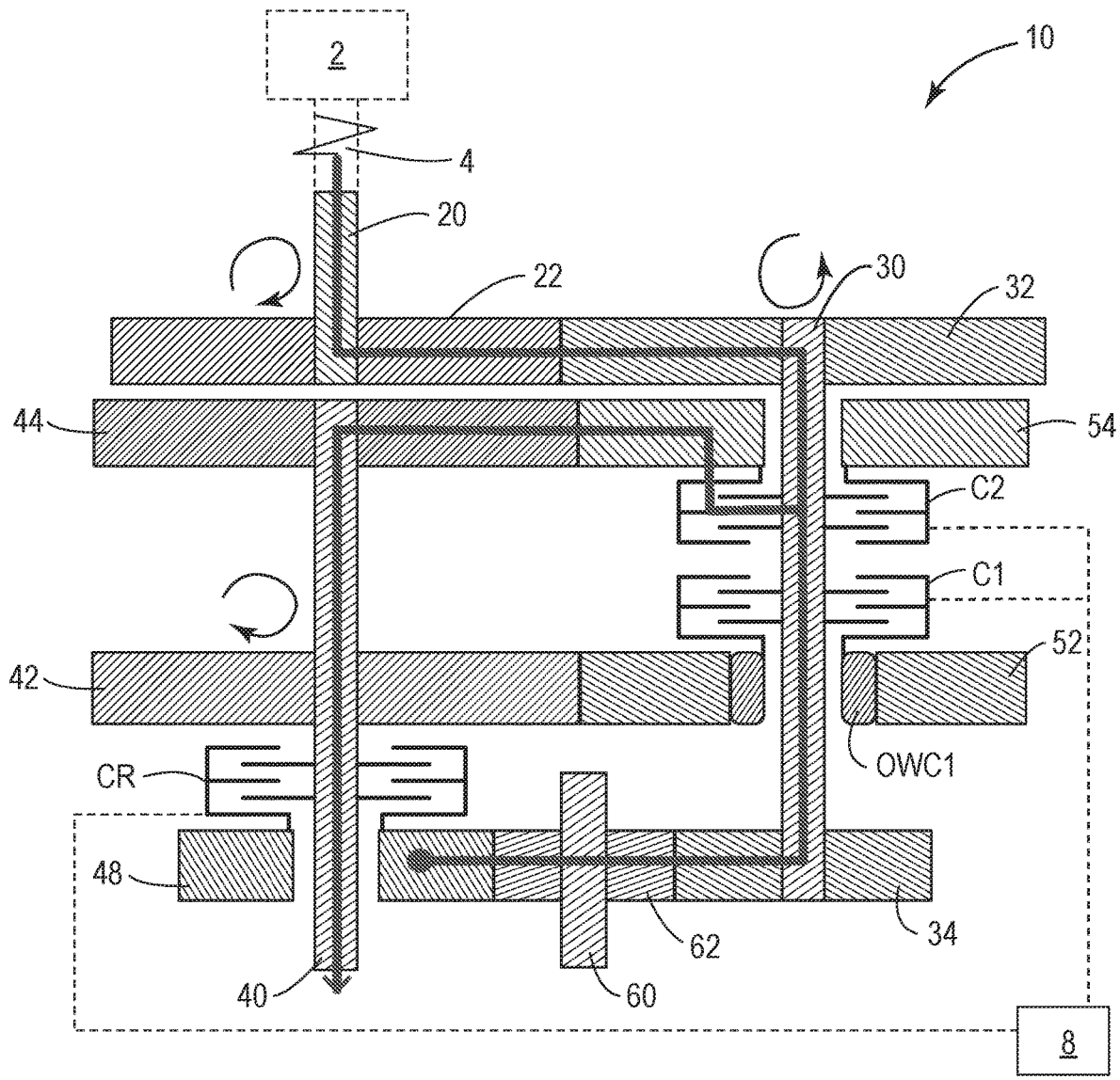
FIG. 2 is a schematic view of an exemplary transmission according to the present disclosure having two forward speeds.

FIG. 2 depicts an exemplary embodiment of a two-speed transmission 10 according to the present disclosure. The transmission 10 has an input shaft 20 that is configured to be coupled to the driveshaft 4 rotated by the engine 2. In this manner, the input shaft 20 is caused to rotate whenever the engine 2 is operating. The input shaft 20 has an input gear 22 that is non-rotatably fixed thereto such that the input gear 22 and input shaft 20 rotate together. The input gear 22 meshes with a countershaft driven gear 32, which is non-rotatably fixed to a countershaft 30. In this manner, the input shaft 20 and the countershaft 30 are configured to rotate in opposite directions. A reverse driving gear 34 is also non-rotatably fixed to the countershaft 30 such that the reverse driving gear 34 also rotates in a direction opposite to the input shaft 20. In the embodiment shown, the countershaft 30 is parallel to the input shaft 20.

The transmission 10 further includes an output shaft 40 having a first driven gear 42 and also a second driven gear 44 that are each non-rotatably fixed thereto. The first driven gear 42 meshes with a first driving gear 52 that is selectively engagable with the countershaft 30 by virtue of a first clutch C1 and first one-way clutch OWC1, which are discussed further below. Similarly, the second driven gear 44 meshes with a second driving gear 54 that, similarly to the first driving gear 52, is selectively engagable with the countershaft 30 via a second clutch C2. When engaged, the first clutch C1 causes the first one-way clutch OFWC1 to rotate by the countershaft 30. Similarly, when the second clutch C2 is engaged, the second driving gear 54 is caused to rotate by the countershaft 30.

The first clutch C1 and second clutch C2 may be selectively engaged or actuated via a clutch actuator 8, which may include mechanical and/or electronic means for engagement of the clutches. As discussed above, the clutch actuator 8 may be further operated using a controller 9 (FIG. 1), such as to provide automatic shifting, and thus automatic actuation of the clutches. In the embodiment presently shown, the second clutch C2 is shown to rotatably engage the countershaft 30 and second driving gear 54 without an additional one-way clutch therebetween. Additional information regarding controllers 9 for operating the transmission 10 are also provide below.

The transmission 10 of FIG. 2 further discloses a reverse idler gear 62 that is supported by and rotates with a reverse idler shaft 60. The reverse idler gear 62 meshes with the reverse driving gear 34 coupled to the countershaft 30. The reverse idler gear 62 further meshes with a reverse driven gear 48 that is selectively engagable with the output shaft 40 by a reverse clutch CR. The reverse clutch CR is also operable through use of the clutch actuator 8 in the manner previously described for the first clutch C1 and second clutch C2.

In this manner, the first clutch C1 selectively rotates the first driving gear 52 with the countershaft 30 (by virtue of the first one-say clutch OWC1), the second clutch C2 selectively rotates the second driving gear 54 with the countershaft 30, and the reverse clutch CR selectively rotates the output shaft 40 with the reverse driven gear 48. By selectively engaging the first clutch C1, second clutch C2, and/or reverse clutch CR, the transmission 10 is shiftable between a first speed mode F1 in which the output shaft 40 rotates in a forward direction at a first speed, a second speed mode F2 with rotation in the forward direction at a second speed that is different than the first speed, and also a reverse mode R in which the output shaft 40 rotates in reverse rotation that is opposite of the forward direction (i.e., opposite the input shaft 20). The transmission 10 also has a neutral mode N in which rotation of the input shaft 20 does not cause rotation of the output shaft 40.

FIG. 2 further incorporates a table showing the combination of engaged and disengaged clutches corresponding to each of the modes for operating the transmission 10. In the embodiment shown, the first clutch C1 is shown to be open in the reverse mode R as well as in the neutral mode N, but closed (engaged) for first speed mode F1 and second speed mode F2. In first speed mode F1, only the first clutch C1 is shown to be closed, or in other words, the second clutch C2 and the reverse clutch CR are open. In this engagement configuration, the first one-way clutch OWC1 is shown to be holding, meaning that the first one-way clutch OWC1 is transmitting the rotation from the countershaft 30 to the first driving gear 52.

In contrast, the transmission 10 is shifted into second speed mode F2 when the second clutch C2 is closed in addition to the first clutch C1. The reverse clutch CR remains open. In this configuration, the first one-way clutch OWC1 is no longer holding, which would provide a power pathway between the countershaft 30 and the first driving gear 52. Instead, the first one-way clutch OWC1 is now overrunning, meaning that the countershaft 30 is free to rotate at a different rate than the first driving gear 52, as the countershaft 30 is instead transmitting power through the second clutch C2 to the second driving gear 54. In this manner, through respective gear ratio differences between the first driving gear 52 and first driven gear 42, as compared to between the second driving gear 54 and the second driven gear 44, dictates the rotational speed of the output shaft 40 relative to the input shaft 20.

It will be recognized that the first one-way clutch OWC1 could be eliminated by instead disengaging the first clutch C1 when shifting to second speed mode F2 (whereby only the second clutch C2 is engaged).

The transmission is in reverse mode R when only the reverse clutch CR is engaged, and in neutral mode N when none of the clutches are engaged.

Figure 3:
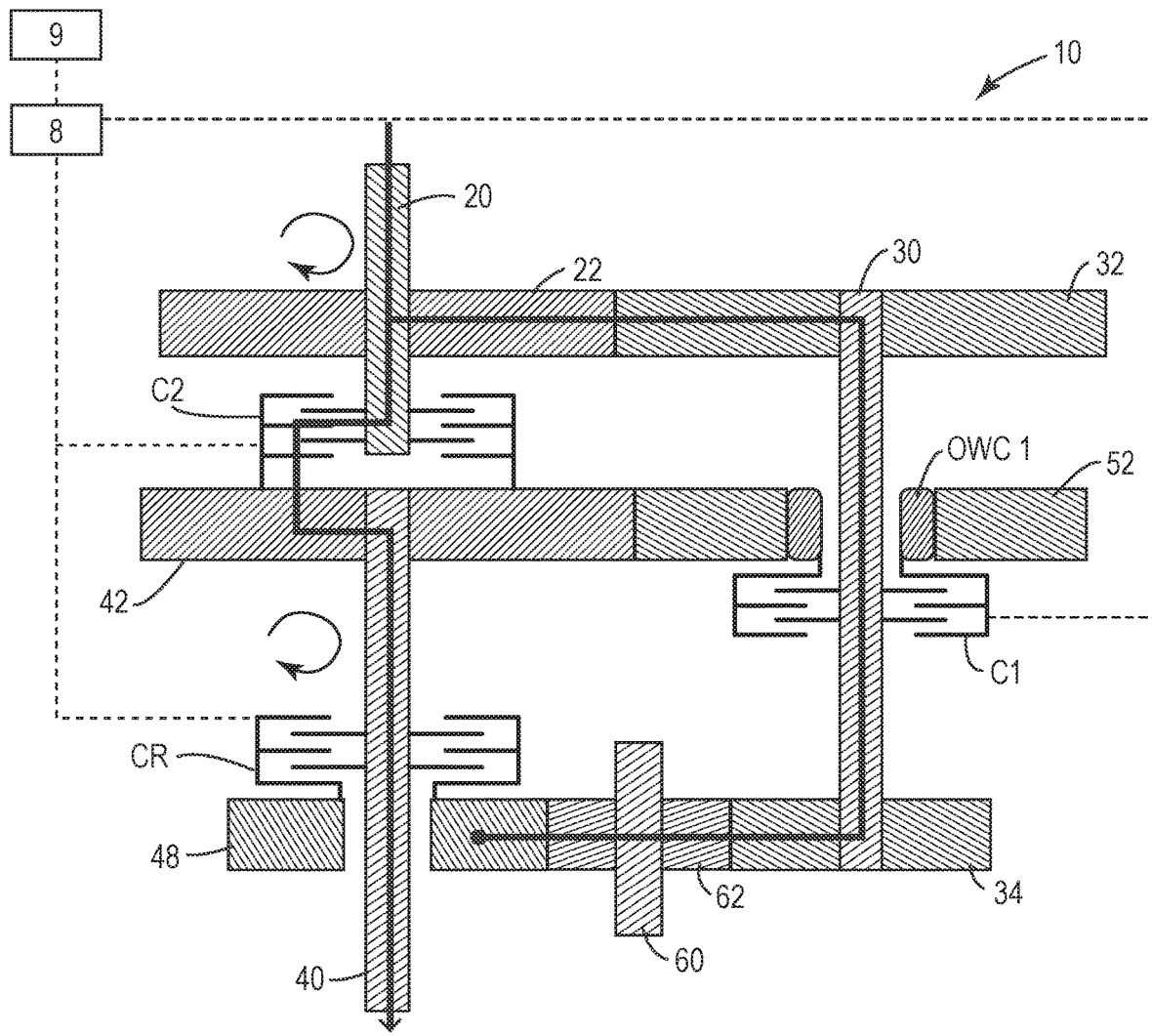
FIGS. 3-4 are schematic views of additional embodiments of transmissions according to the present disclosure having two forward speeds and three forward speeds, respectively.

FIG. 3 depicts an alternate embodiment for a two-speed transmission 10, once again incorporating a first clutch C1, second clutch C2, reverse clutch CR, and first one-way clutch OWC1. However, in the embodiment shown, the second clutch C2 now directly engages the input shaft 20 and the output shaft 40 without incorporating the meshing of gears. The input shaft 20 and the output shaft 40 are not only parallel (as is also true of the countershaft 30), but are also coaxial. The inventors have found this configuration to be particularly advantageous because directly rotating the second driven gear 44 straight through the third clutch C3 from the input shaft 20 to the output shaft 40 results in less parasitic drag torque, in other words less power lost, by bypassing the countershaft 30. This can improve transmission efficiency and reduce the duty cycle requirements of components, further improving sizing and durability. Along with eliminating additional gearsets, this allows the transmission 10 package size to be shortened.

It will be recognized that the table associated with the embodiment of FIG. 3 is otherwise the same as the embodiment of FIG. 2. However, by directly coupling rotation of the input shaft 20 to the output shaft 40 in second speed mode F2, the packaging size of the transmission 10 may be reduced by eliminating the second driving gear 54 and second driven gear 44 in contrast to that shown in FIG. 2.

Figure 4:
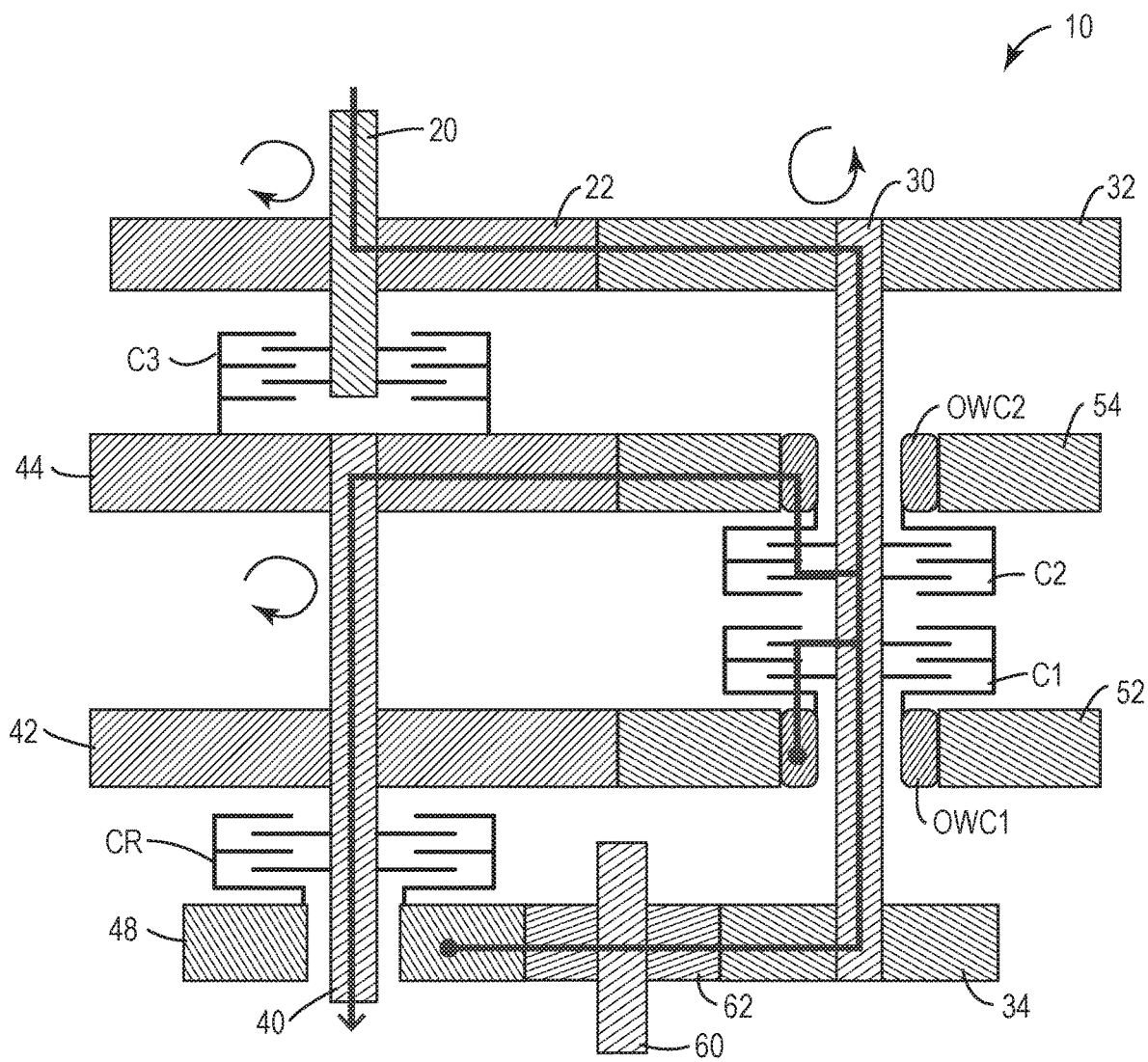

The present inventors have further identified that elements of the embodiments previously discussed may be further combined to provide even further designs of transmission 10, including those having additional speeds. In particular, FIG. 4 shows a transmission 10 having three speeds, first speed mode F1, second speed mode F2, and third speed mode F3 corresponding to three different forward rotational speeds of the output shaft 40 relative to the input shaft 20. The neutral mode N and reverse mode R remain available as well in the manner previously described.

In the embodiment of FIG. 4, the transmission 10 is shifted to first speed mode F1 in much the same manner as shown in the embodiments of FIGS. 2 and 3. Likewise, shifting to third speed mode F3 via the third clutch C3 is similar to shifting to the second speed mode F2 (via second clutch C2) in the embodiment of FIG. 3. However, the embodiment of FIG. 4 now reintroduces the second driven gear 44 and second driving gear 54 as shown in the embodiment of FIG. 2. Additionally, a second one-way clutch OWC2 is now integrated between the second clutch C2 and the second driving gear 54.

As shown in the table of FIG. 4, the one-way clutch OWC1 is holding in first speed mode F1, but overrunning in the manner previously described when the transmission 10 is shifted into second speed mode F2 or third speed mode F3. Likewise, the second one-way clutch OWC2 is holding when the transmission 10 is in second speed mode F2, and overrunning when the transmission 10 is in third speed mode F3. In this manner, the overall size and weight of the transmission 10 is minimized, while nonetheless providing multi-speed control as either a two-speed or three-speed transmission in the manners previously described.

As described above, the present inventors have further identified that the components within the transmission 10 may be further reduced in size by diverting some of the speed reduction between the driveshaft 4 and the propeller shaft PS to a speed reduction device 100 separate and distinct from the transmission 10 itself. This allows the components within the transmission 10 to be smaller and rated for lower torque reductions, reducing size and weight of the transmission 10.

Figure 5:
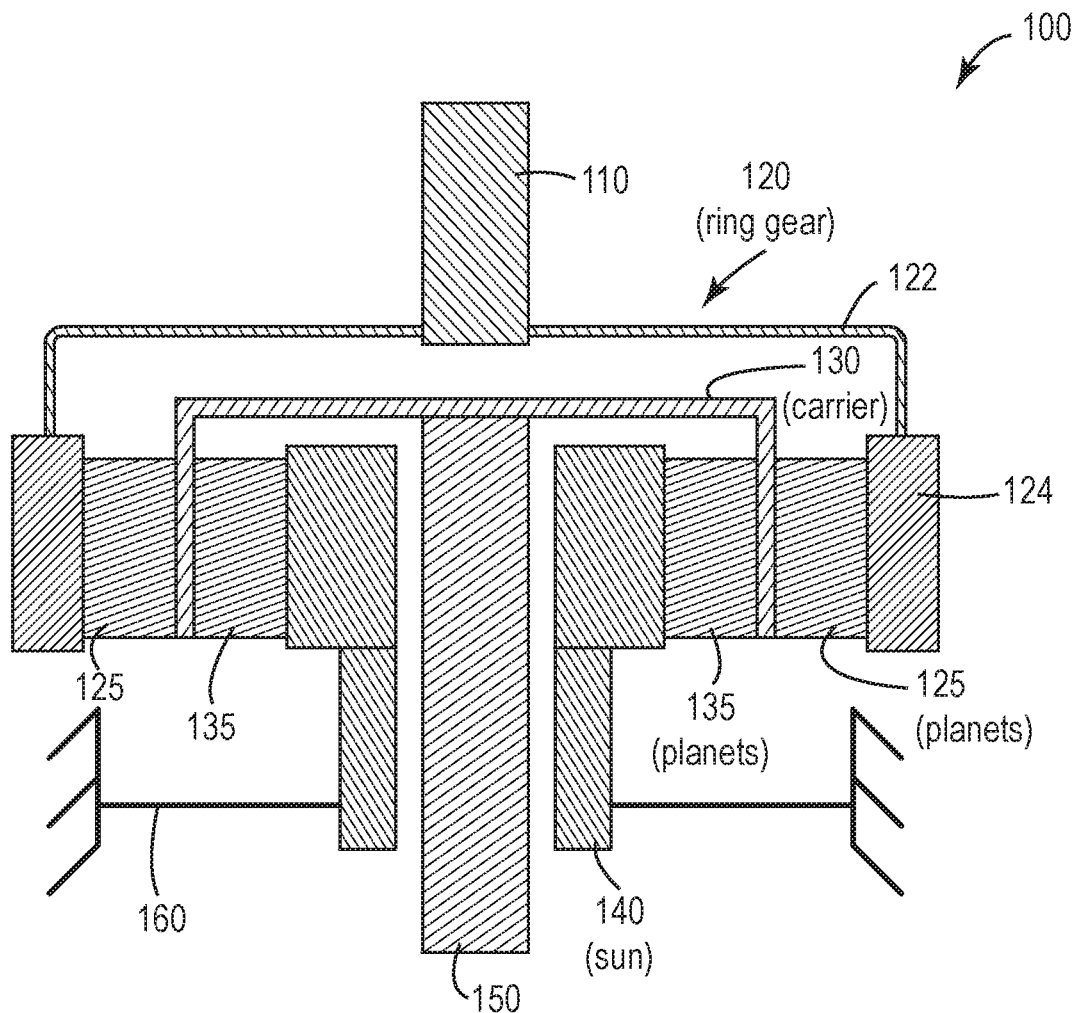
FIG. 5 is a schematic view of an exemplary speed reduction device known in the art, which may be coupled with the presently disclosed transmissions.

For example, one of the transmissions 10 previously disclosed may be coupled to a speed reduction device 100 as shown in FIG. 5. FIG. 5 depicts an exemplary planetary gear system as known in the art, which receives rotation at an input shaft 110 and provides rotation to an output shaft 150. In this case, the speed reduction device 100 is configured such that the output shaft 150 rotates at a reduced speed relative to the input shaft 110.

In the embodiment shown, the input shaft 110 may be coupled to rotate with the output shaft 40 of one of the transmissions 10 previously disclosed. Rotation of the input shaft 110 causes rotation of the ring gear 120 in the manner known in the art, which by virtue of arms 122 coupled to outer gears 124 rotates with the input shaft 110. Rotation of the ring gear 120 causes rotation of planets 125 positioned rotationally between the ring gear 120 and a carrier 130. Additional planets 135 are also positioned between the carrier 130 and a sun gear 140, which is non-rotationally anchored via fixators 160 in the manner known in the art. As such, rotation of the input shaft 110 causes corresponding rotation of the carrier 130 by virtue of the planets 125, 135 therebetween, thereby rotating the output shaft 150 at a reduced speed.

In this manner, the present inventors have identified that coupling the speed reduction device 100 with one of the transmissions 10 previously disclosed results in a simplified overall transmission system, while also yielding a reduction in the size and weight of the transmission 10 despite providing multi-speed shifting thereof.

Additional information is now provided with respect to controlling the transmission 10 in certain embodiments. Certain aspects are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices. The connections between functional and logical block components are merely exemplary, which may be direct or indirect, and may follow alternate pathways.

Figure 6:
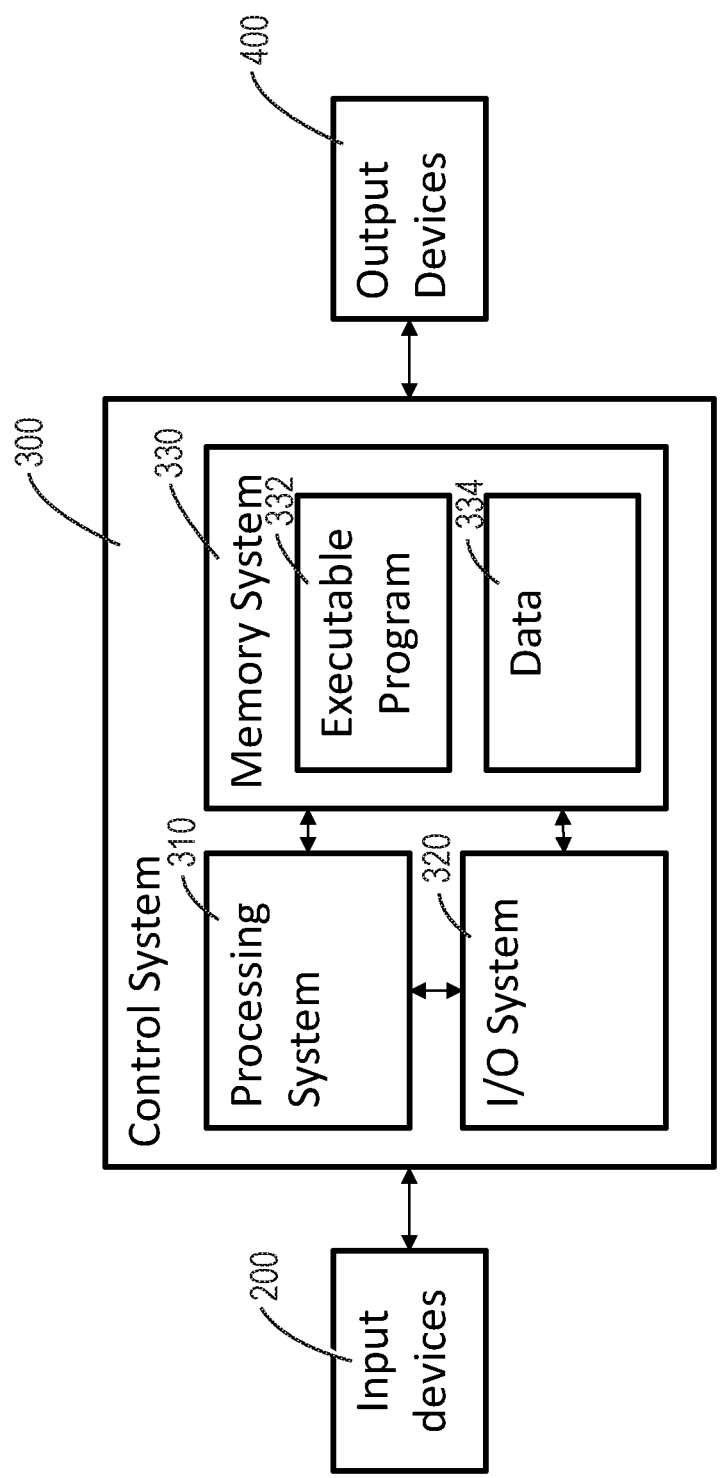
FIG. 6 is a schematic view of an exemplary control system for controlling the transmission according to the present disclosure.

As shown in the exemplary embodiment of FIG. 6, the controller 9 may include a computing system 300 that includes a processing system 310, memory system 330, software and/or data 334, and input/output (I/O) system 320 for communicating with other devices, such as input devices 200 and output devices 400. Exemplary input devices 200 include manual and/or electronic shifters, a user interface device such as a touch screen monitor, various sensors, and/or the like. Exemplary output devices 400 include the clutch actuator 8, as well as status indicators (i.e., LED lights indicating selected modes), display devices, and/or the like. The processing system 310 loads and executes an executable program 332 from the memory system 330, accesses data 334 stored within the memory system 330, and directs the transmission 10 to operate in the manner previously described.

The processing system 310 may be implemented as a single microprocessor or other circuitry, or be distributed across multiple processing devices or sub-systems that cooperate to execute the executable program 332 from the memory system 330. Non-limiting examples of the processing system include general purpose central processing units, applications specific processors, and logic devices.

The memory system 330 may comprise any storage media readable by the processing system 310 and capable of storing the executable program 332 and/or data 334. The memory system 330 may be implemented as a single storage device, or be distributed across multiple storage devices or sub-systems that cooperate to store computer readable instructions, data structures, program modules, or other data. The memory system 330 may include volatile and/or non-volatile systems, and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A transmission for a marine propulsion device, the transmission comprising:
   an input shaft having an input gear non-rotatably fixed thereto;
   a countershaft with a countershaft driven gear and a reverse driving gear each non-rotatably fixed thereto, wherein the countershaft driven gear meshes with the input gear such that forward rotation of the input shaft causes reverse rotation of the countershaft;
   an output shaft with a first driven gear and a second driven gear each non-rotatably fixed thereto;
   a first driving gear that meshes with the first driven gear, a second driving gear that meshes with the second driven gear, a reverse idler gear that meshes with the reverse driving gear, and a reverse driven gear that meshes with the reverse idler gear; and
   a plurality of clutches including a first clutch, a second clutch, and a reverse clutch, wherein the first clutch selectively rotates the first driving gear with the countershaft, the second clutch selectively rotates the second driving gear with the countershaft, and the reverse clutch selectively rotates the output shaft with the reverse driven gear;

wherein selectively engaging the plurality of clutches selects between rotation of the output shaft in a first mode with forward rotation at a first speed, a second mode with forward rotation at a second speed that is different than the first speed, and a reverse mode with reverse rotation.

2. The transmission according to claim 1, wherein rotation of the input shaft does not cause rotation of the output shaft when the transmission is in a neutral mode in which each of the plurality of clutches is simultaneously disengaged.

3. The transmission according to claim 1, further comprising a one-way clutch disposed between the first clutch and the first driving gear, wherein the one-way clutch is configured to be holding when the transmission is in the first mode and over-running in the second mode.

4. The transmission according to claim 1, wherein the input shaft, the countershaft, and the output shaft are all parallel to each other.

5. The transmission according to claim 1, wherein the input shaft and the output shaft are coaxially aligned.

6. The transmission according to claim 5, further comprising a one-way clutch disposed between the first clutch and the first driving gear that is configured to be holding when the transmission is in the first mode and over-running in the second mode.

7. The transmission according to claim 1, wherein the transmission is in the first mode when only the first clutch is engaged, wherein the transmission is in the second mode when the first clutch and the second clutch are both engaged and the reverse clutch is disengaged, and wherein the transmission is in the reverse mode when only the reverse clutch is engaged.

8. The transmission according to claim 7, wherein the input shaft and the output shaft are coaxially aligned, further comprising a one-way clutch disposed between the first clutch and the first driving gear that is configured to be holding when the transmission is in the first mode and over-running in the second mode.

9. A powertrain for a marine propulsion device including the transmission according to claim 1, further comprising a speed reduction gearset that is coupled to the output shaft of the transmission, wherein the speed reduction gearset has a second output shaft that rotates slower than the output shaft.

10. The powertrain according to claim 8, wherein the speed reduction gearset is a planetary gearset including a sun gear, a ring gear, and a plurality of planet gears.

11. A transmission for a marine propulsion device, the transmission comprising:

an input shaft having an input gear non-rotatably fixed thereto;

a countershaft with a countershaft driven gear and a reverse driving gear each non-rotatably fixed thereto, wherein the countershaft driven gear meshes with the input gear such that forward rotation of the input shaft causes reverse rotation of the countershaft;

an output shaft with a first driven gear non-rotatably fixed thereto;

a first driving gear that meshes with the first driven gear, a reverse idler gear that meshes with the reverse driving gear, and a reverse driven gear that meshes with the reverse idler gear; and a plurality of clutches including a first clutch, a second clutch, and a reverse clutch, wherein the first clutch selectively rotates the first driving gear with the countershaft, the second clutch selectively rotates the first driving gear with the input shaft, and the reverse clutch selectively rotates the output shaft with the reverse driven gear;

wherein selectively engaging the plurality of clutches selects between rotation of the output shaft in a first mode with forward rotation at a first speed, a second mode with forward rotation at a second speed that is different than the first speed, and a reverse mode with reverse rotation.

12. The transmission according to claim 11, wherein rotation of the input shaft does not cause rotation of the output shaft when the transmission is in a neutral mode in which each of the plurality of clutches is simultaneously disengaged.

13. The transmission according to claim 11, further comprising a one-way clutch disposed between the first clutch and the first driving gear, wherein the one-way clutch is configured to be holding when the transmission is in the first mode and over-running in the second mode.

14. The transmission according to claim 11, wherein the input shaft, the countershaft, and the output shaft are all parallel to each other.

15. The transmission according to claim 11, wherein the input shaft and the output shaft are coaxially aligned.

16. The transmission according to claim 15, further comprising a one-way clutch disposed between the first clutch and the first driving gear that is configured to be holding when the transmission is in the first mode and over-running in the second mode.

17. The transmission according to claim 11, wherein the transmission is in the first mode when only the first clutch is engaged, wherein the transmission is in the second mode when the first clutch and the second clutch are both engaged and the reverse clutch is disengaged, and wherein the transmission is in the reverse mode when only the reverse clutch is engaged.

18. The transmission according to claim 17, wherein the input shaft and the output shaft are coaxially aligned, further comprising a one-way clutch disposed between the first clutch and the first driving gear that is configured to be holding when the transmission is in the first mode and over-running in the second mode.

19. A powertrain for a marine propulsion device including the transmission according to claim 11, further comprising a speed reduction gearset that is coupled to the output shaft of the transmission, wherein the speed reduction gearset has a second output shaft that rotates slower than the output shaft.

20. The powertrain according to claim 19, wherein the speed reduction gearset is a planetary gearset including a sun gear, a ring gear, and a plurality of planet gears.

* * * * *